Dec. 16, 1947. W. H. FORMHALS ET AL 2,432,876
CONTROL SYSTEM
Filed July 2, 1945
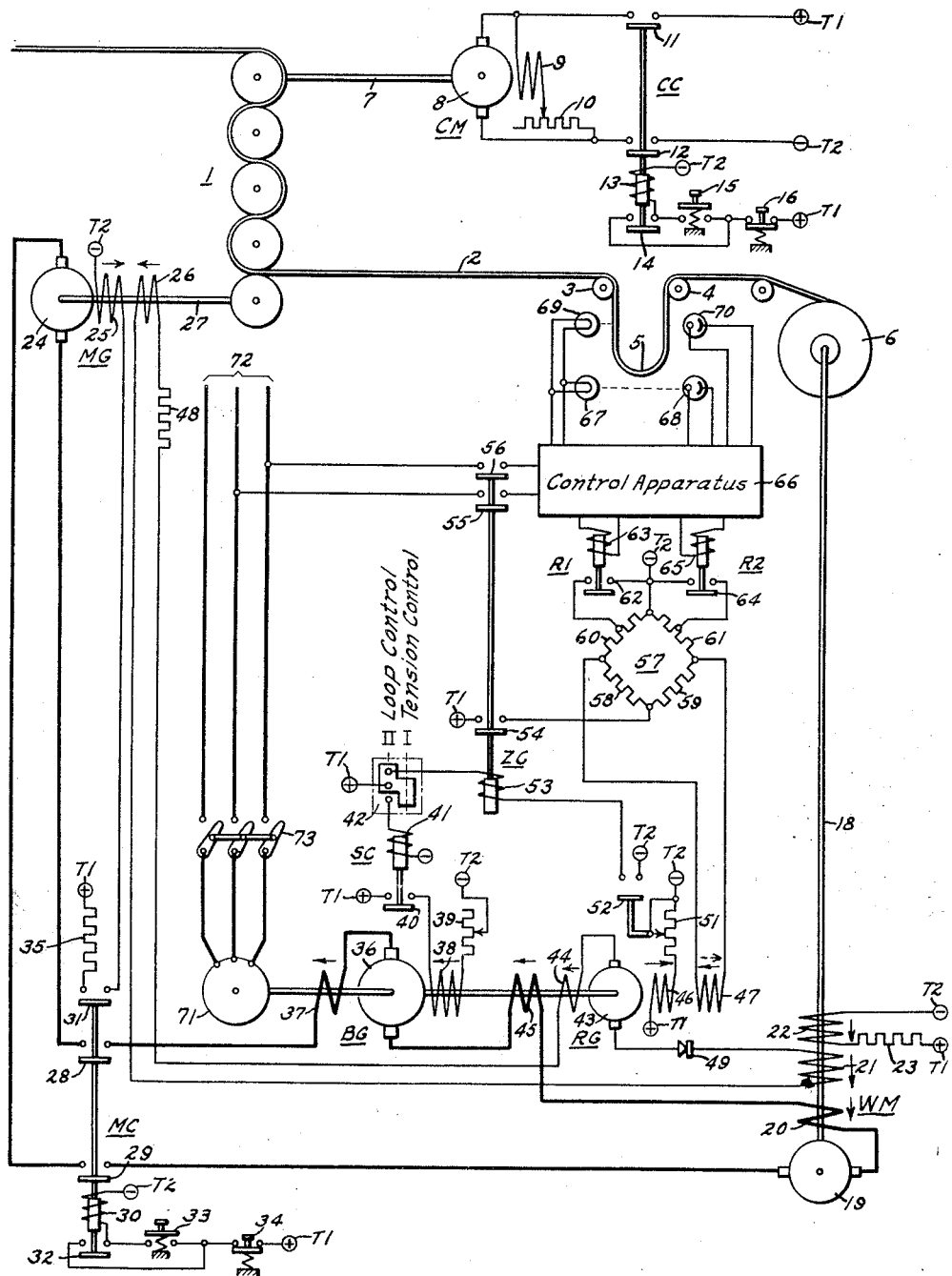
WITNESSES:
Leo M. Garman
Curt M. Avey
INVENTORS
William H. Formhals and
Frank C. Fennell.
BY
Paul E. Friedemann
ATTORNEY

UNITED STATES PATENT OFFICE 2,432,876

CONTROL SYSTEM

William H. Formhals, Pittsburgh, and Frank C. Fennell, Greensburg, Pa., assignors to Westinghouse Electric Corporation, East Pittsburgh, Pa., a corporation of Pennsylvania Application July 2, 1945, Serial No. 602,864

11 Claims. (Cl. 242—75)

Our invention relates to systems for controlling the operation of electric motors and, in one of its aspects, to wind-up drives for strand or sheet material as used, for instance, in connection with paper or textile machines, rubber fabricating devices and the like machinery.

It is an object of the invention to provide a motor control system which is capable of automatic speed regulation over an extremely wide range of control.

Another object of the invention is the provision of a control system for driving a motor at a variable speed which is correlated to that of separately driven associated machinery and controlled in accordance with an operating condition of the machine or device driven by the speed-controlled motor. An object subsidiary to the one just mentioned is to operate a wind-up drive at a speed which depends on two variable determinants, i. e., which is controlled in accordance with the speed of a calender or other associated machinery supplying the strand or sheet material to be wound and which is also varied automatically so as to adapt itself to the changing diameter of the wound-up roll of material.

A further object of our invention is to devise a control system for a winder drive which, at the choice of the operator, permits adjusting the drive for winding the material at a constant tension of selected value or at substantially zero tension; and we aim also at providing such a system with means for maintaining an adjusted tension under stalled conditions of the machinery from which the winding material is to be taken.

It is also an object of the invention to design a speed regulated winder drive as a variable voltage drive in which the same regulating generator performs the function of regulating the motor speed for maintaining an adjusted running tension of the winding material and serves also for winding the material under substantially zero tension, depending upon a selective adjustment of the field control means of the regulating generator.

A still further object, allied to some of those above mentioned, is to design a winder drive capable of being controlled either by the positional change of a slack loop of the winding material or by the load or current condition of the winder motor, in accordance with the desired winding tension.

According to our invention, in one of its aspects, we equip the energizing system of a direct current motor with regulating means which vary the armature voltage and the field excitation of the motor simultaneously and in such a relation to each other as to obtain thereby an extended range of speed control.

According to another aspect of the invention, a direct-current motor for a winder is energized in a variable voltage system whose generator has its armature driven at a speed dependent upon that of separately driven machinery, for instance, proportionately to the speed of a calender or other machine from which the material to be wound up is taken, and the field excitation of the generator or motor or preferably of both the generator and motor, is regulated in order to obtain the desired variation in motor speed.

According to further features of the invention, we provide a variable voltage winder drive of the type just mentioned with a regulating generator which operates at substantially constant speed and supplies the above-mentioned regulated field excitation. The regulating generator is of the amplifying type, that is, it operates along the unsaturated portion of its magnetic characteristic and has preferably a self-energizing field winding whose resistance line coincides approximately with the no-load saturation characteristic of the regulating generator so that it tends to sustain the armature voltage adjusted by other, separately excited field windings. These other field windings of the regulating generator include a pattern field winding which is excited by an adjusted constant voltage whose selected magnitude determines the tension condition of the material to be wound up by the motor, and a pilot field winding which is energized in accordance with the armature current of the motor and acts differentially as regards the pattern field winding so as to balance its effect when the armature current corresponds to the desired winding tension.

The term "self-energizing" field winding as used in this specification is intended to refer to those winding turns of a generator that receive excitation from the electric energy generated in the armature of the same generator and hence provide self-energization for that generator, and, as stated above, the resistance of the circuit of such a "self-energizing" field winding is to be rated so that the self-energization of the generator is just sufficient to substantially sustain the generated output voltage at the value controlled by the separately excited field windings.

In accordance with another feature of the invention, we provide a winder drive as last mentioned, with loop-controlled apparatus, for instance of the photo-electric type, and connect this apparatus with the regulating generator in order to control it in dependence upon the positional changes of a slack loop formed by the winding material. To achieve such a loop control of the regulating generator, we provide it with another pilot field and energize the latter through the loop-position responsive control apparatus.

In still another aspect of the invention related to the foregoing, we provide interlocking means between the loop-controlled apparatus and the tension adjusting means in the circuit of the pattern field winding so that the loop control can be rendered operative only when the pattern field is excited for no-load or zero tension operation of the winder motor.

Our invention provides also means for maintaining in the motor armature circuit of the variable voltage drive of a winder an adjusted current when the calender or other machinery driving the main generator is stalled, thereby securing a desired stall tension in the material during periods of stoppage. When designing the motor control system as a variable voltage drive and providing it with a control generator or boosting generator operating at a constant speed, we prefer according to another feature of the invention to use one of these auxiliary generators as a current source which maintains a properly rated current in the armature circuit of the motor under stalled conditions of the main generator so as to secure the desired stall tension of the winder drive.

These and other objects and features of our invention will be apparent from the following description of the embodiment exemplified by the drawing.

The drawing illustrates diagrammatically a rubber calender and an appertaining winder drive, in conjunction with a control system according to the invention, which permits winding the calendered material selectively under adjusted and regulated tension or under no tension, at the choice of the operator.

The rubber calender as a whole is denoted by numeral 1. The strip material 2 passes from the calender over guide rollers 3 and 4, and as here shown, forms a slack loop 5 between the two rollers before it is wound up on a core type reel 6.

The calender is driven through a suitable transmission, here represented schematically by a shaft 7, from the armature 8 of a drive motor CM. The main field winding 9 of motor CM is connected across the armature terminals through an adjusting rheostat 10 and is energized, from direct-current terminals T1 and T2. through the contacts 11 and 12 of a contactor CC whose control coil 13 operates also a self-sealing contact 14. The coil circuit extends through a normally open start contact 15 and a normally closed stop contact 16 and is energized from direct-current terminals, which are also denoted by T1 and T2. It is to be understood that all terminals designated by T1 in the drawing are connected to the positive bus of a direct-current energizing circuit or represent schematically this positive bus, while all terminals denoted in the drawing by T2 are connected to the negative bus or represent the negative bus of the same energizing circuit.

The calender motor CM is started by closing the start contact 15, this energizes the contactor coil 13 which closes the motor circuit and seals itself in at contact 14. Hence, the contactor CC remains closed when contact 15 is thereafter released. The subsequent actuation of the stop contact 16 interrupts the self-sealing circuit of coil 13 and returns the contactor CC into the illustrated open position, thereby stopping the calender motor.

The core of the wind-up reel 6 is driven through a suitable transmission, here shown schematically as a shaft 18, from the armature 19 of a winder motor WM, which has a series field winding 20, a regulating field winding 21, and a separately excited field winding 22. Winding 22 is energized from the above-mentioned direct-current circuit through an adjusting or calibrating resistor 23.

The armature 19 and the series field winding 20 of winder motor WM are mainly energized from a main generator MG with whose armature 24 they are series-connected. Generator MG has a main field winding 25 and a regulating field winding 26. Armature 24 is connected with the calender 1 by a transmission, here schematically shown as a shaft 27. Due to this connection, the speed of generator MG is always proportional to the operating speed of the calender 1 so that the voltage generated in armature 24 and imposed on the winder motor WM varies in dependence upon the speed variation of the calender, thereby causing the speed of motor WM to match substantially the calender speed and the travelling speed of the material 2.

The circuit connection between the main generator armature 24 and the armature 19 and series field 20 of the winder motor WM is controlled by the contacts 28 and 29 of a main contactor MC. The control coil 30 of this contactor actuates also two additional contacts 31 and 32. The circuit of coil 30 extends through a normally open start contact 33 and a normally closed stop contact 34, and receives excitation from the above-mentioned direct-current circuit. When contact 33 is temporarily closed, coil 30 closes all four contacts of the contactor and seals itself in at contact 32 so that the armature circuit of generator MG and motor WM remains closed until the stop button 34 is depressed. The contact 31 when closing connects the main field winding 25 of generator MG to the above-mentioned direct-current circuit through a calibrating resistor 35. Consequently, the main field excitation of generator MG is also switched in only when the main contactor MC is closed.

The armature circuit of generator MG and motor WM includes also the armature 36 and a series field winding 37 of a booster generator BG which serves to provide a corrective voltage in order to compensate the IR drop in the generator motor circuit, thus securing substantially linear proportionality between the speed of motor WM and the terminal voltage of generator MG. The booster generator BG has a separately excited field winding 38 connected to the separate direct-current source through a rheostat 39 under control by the contact 40 of a contactor SC. The control coil 41 of this contactor is energized through a selective switch 42, shown in developed form, which can be placed in two positions denoted by I and II. The selected position of this switch determines whether the control system operates for winding the material under tension or without appreciable tension. When the switch is in the position I, the contactor SC, during the operation of the system, is energized so that the field winding 38 is excited in accordance with the selected adjustment of the rheostat 39. This adjustment determines the tension of the material under stalled conditions of the reel 6, as will be understood from the following explanation of the operation of the system.

The regulating field winding 21 of winder motor WM and the regulating field winding 26 of generator MG are energized by a regulating generator RG whose armature is denoted by 43. Generator RG has a self-energizing field winding 44, a pilot field winding 45, a pattern field winding 46, and an auxiliary pilot field winding 47. Armature 43 and self-energizing field winding 44 are series-connected with the regulating field windings 21 and 26 through a calibrating resistor 48 and a rectifier 49. The rectifier prevents an excitation of the two regulating field windings in an unsuitable direction. The resistor 48 is adjusted so as to render the resistance line of the self-energizing field winding 44 approximately coincident with the no-load saturation characteristic of the generator RG. Due to this calibration, the field winding 44 tends to maintain the regulator voltage at any value determined by the resultant control effect of the other field windings of generator RG.

The arrows shown in the drawing close to the field windings of the electric machines serve to indicate whether the windings of each individual machine act cumulatively or in opposition to one another. A full arrow and an opposingly directed broken arrow are shown next to the auxiliary pilot field winding in order to indicate that this winding may reverse its flux direction as will be explained in a later place.

The pattern field winding 46 of generator RG is excited from the separate direct-current source through a rheostat 51 which serves to adjust the desired running tension of the winder drive when the system operates for placing a selected winding tension on the strip material wound up on the reel. The slider of rheostat 51 is provided with an interlock contact 52 which is closed only when the tension control rheostat 51 is adjusted to the all-in position in order to place minimum tension on the material. The closure of contact 52 completes a circuit for the coil 53 of a zero tension contactor ZC through the above-mentioned selector switch 42, but only when this switch is placed in position II for loop control. Contactor ZC has three contacts 54, 55, and 56. Contact 54 when closed energizes a Wheatstone bridge arrangement 57 composed of four resistors 58, 59, 60, and 61 of which the resistors 60 and 61 are tapped in order to permit being partly short-circuited under control by a relay R1 or R2. Relay R1 has a short-circuiting contact 62 controlled by a coil 63, and relay R2 has a corresponding contact 64 controlled by a coil 65. The coils 63 and 65 are selectively energized by a control apparatus 66 which operates in response to photoelectric control means which, in turn, are controlled by the slack loop 5 of the strip material 2. Details of the control apparatus 66 are not illustrated because such apparatus are well known and customary and do not, as such, form part of the present invention proper. The control apparatus 66 receives energization under control by the contacts 55 and 56 of the above-mentioned zero tension contactor ZC. Consequently, the photoelectric control is in operative condition only when the selector switch 42 is placed in the loop control position II and when the tension control rheostat 51 is adjusted for minimum tension, thereby closing the contact 52. The photoelectric gauging means of the control apparatus 66 comprise a lamp 67 cooperating with a photocell 68 and a second lamp 69 cooperating with a photocell 70. The connection of these photoelectric means with the relays R1 and R2 is such that relay R1 closes its contact 62 when the lower light beam is intercepted by the slack loop 5. When the upper light beam of lamp 69 is not intercepted by the loop 5, the relay R2 closes its contact 64. The closure of contact 62 or 64 disturbs the balance of the bridge arrangement 57 so that the auxiliary pilot field 47 connected to the output terminals of the arrangement is energized in one or the other direction depending upon which of the relays has closed. The auxiliary pilot field winding 47 will then cause the regulating generator RG to excite the field windings 21 and 26 in such a manner as to change the speed of motor 19 in the direction necessary to maintain the slack loop 5 between the upper and lower beams of light.

The regulating generator RG and the booster generator BG are driven at substantially constant speed, and for this purpose are preferably provided with a common shaft driven by a constant speed motor 71. The motor is energized from a current source 72 through a control switch 73.

In order to explain the performance of the system, let it first be assumed that the selector switch 42 is in position I for tension control so that contactor ZC is deenergized, the control apparatus 66 with associated relays R1 and R2 inoperative, and the slack loop 5 eliminated for winding the material 2 under constant tension. When under these conditions the calender motor CM is running at a selected constant speed and the main contactor MC is closed, the regulating generator RG has the effect of maintaining a constant current in its pilot field winding 45, the amount of this current being determined by the selected setting of the rheostat 51 in the circuit of the pattern field winding 46. This regulation for constant current in pilot field winding 45 is caused by the fact that any change in that current produces a corresponding change in the armature output voltage of the regulating generator RG, and this change in voltage varies the excitation of the motor field winding 21 as well as the excitation of the main generator field winding 26 in the sense required to change the speed of motor WM to a value at which the motor current, and hence that of the series-connected pilot field winding 45 is again at the previous value.

It will be apparent that this speed control of the motor WM by the action of the regulating generator RG is due to two component control effects, one being due to the weakening and strengthening of the regulating field winding 21 of motor WM while the other component control effect is caused by the weakening and strengthening of the regulating field winding 26 and hence by a corresponding change in the output voltage of the main generator MG. For the purpose of explanation, these two component effects will be discussed separately.

First, let us disregard the effect of the generator regulating field winding 26 as if that winding were not present. Then, at a selected constant speed of the calender motor CM, the output voltage of the main generator MG will remain constant; and, due to the IR drop compensation introduced by the booster generator BG, the voltage across the terminal of the motor WM will also remain constant so that the speed control of motor WM is effected only by the change in excitation of its regulating field winding 21. Neglecting friction and windage losses, the tension in the material to be wound by a core type winder is proportional to the power input (kilowatts) of the winder motor. Hence, as the voltage across the motor WM is constant and the motor speed so controlled as to maintain constant current, the power input of the motor remains constant so that the tension of the winding material is also substantially constant under the just-mentioned condition. That is, as the diameter of the roll of material on reel 6 increases, the load current of motor WM would increase if the motor kept running at the same speed. However, since any increase in motor current is sensed by the regulator pilot field winding 45 with the effect of strengthening the motor regulating field winding 21, the motor speed decreases with increasing roll diameter at the rate needed to maintain substantially constant tension in the winding material.

Turning now to the second component control effect of the regulating generator, let us now consider the fact that when the regulating generator, due to current increase in its pilot field winding 45, strengthens the regulating motor field winding 21, it also increases the excitation of the regulating field winding 26 in the main generator MG.

The regulating field 26 of generator MG acts in opposition to the main generator field winding 25 so that the resultant field excitation of the main generator depends on the differential excitation of the two windings. As the excitation of winding 26 is increased, the ampere turns of this winding weakens resultant excitation. Consequently, as the winder motor WM is slowed down by the strengthening of field winding 21 due to the regulating action of the regulating generator RG, the terminal voltage of motor WM is simultaneously somewhat lowered by the interaction of the two generator field windings 25 and 26. Conversely, when the motor field is weakened at high speed due to the reduced excitation supplied by regulator RG to field winding 21, the armature voltage of motor WM is simultaneously somewhat increased because the differential effect of generator field winding 26 is now reduced. That is, when the regulating generator RG varies the motor field excitation for changing the motor speed it superimposes a voltage correction in the same speed-controlling sense as that of the motor field regulation. As a result of this combined field and voltage regulation is the fact that the obtainable total speed ranges is larger than that resulting from field control alone, so that the system permits a larger increase in roll diameter than the conventional maximum increase of 1 to 5. The voltage regulation by generator field winding 26 tends also to compensate for the increased friction and windage losses of the motor and reel operating at high speed. This compensation is due to the fact that at increasing motor speeds, i. e., when the motor field winding 21 and the generator field winding 26 receive decreasing excitation, the generator voltage increases so that, at regulated constant current, the kilowatt input to the motor increases and hence counteracts the increase in friction and windage losses. In this manner a higher degree of constancy in tension is maintained in the winding material than obtainable if current regulation alone is relied upon.

The load current of motor WM and hence the winding tension to be maintained constant can be adjusted at will by changing the position of the tension adjusting rheostat 51.

It has been assumed above that the calender motor CM, during the performance explained so far, operates at constant speed so that the main generator MG runs also at constant speed and, aside from the superimposed regulating effect of field winding 26, imposes a corresponding voltage on the armature circuit of the winder motor WM. Let us now consider the change in operation that occurs when the speed of motor CM is changed by a change in adjustment of its field rheostat 10. If, as may first be assumed, the adjustment of the tension control rheostat 51 remains unchanged, the increase in speed of the calender-driven main generator MG has the effect of increasing the voltage impressed by generator armature 24 on the armature circuit of the winder motor WM. If the field of generator MG were determined only by the constant excitation of its main field winding 25, the voltage increase would be substantially proportional to the increase in generator speed and would tend to make motor WM run at a substantially proportionately increased speed if, at constant load, the field of the motor were determined only by the constant excitation of its main field winding 22. However, the generator field, before the speed increase took effect, was also affected by the voltage reducing field correction imposed by the regulating field winding 26, and the motor field was corrected by the speed-reducing effect of the regulating field winding 21. Consequently, the speed of motor WM would increase substantially in proportion to the increase in generator speed only if the speed reducing effects of field windings 26 and 21 increased in approximate proportion to those obtaining previous to the generator speed increase. Such an increase in the effects of the two regulating field windings is in fact present, due to the operation of the regulating generator RG. That is, the increase in voltage from generator MG tends to force a higher current through the circuit of the pilot field winding 45, and this causes the regulating generator RG to increase its output voltage so as to strengthen the excitation of field windings 21 and 26 with the result of maintaining pilot field winding at the previous value. Hence, when the new condition is reached, the speed of motor WM tends to assume a value increased about in proportion to the increase in calender speed and this motor speed is automatically adjusted by the regulating generator so as to maintain the tension in the winding material constant in the manner explained previously.

When the system operates under the increased speed condition just mentioned, the armature current of the winder motor, assuming as above that rheostat 51 has not been readjusted, is the same as before, but the terminal voltage and hence the power input of the motor are increased. This (as well as the fact that the motor field is now stronger than before) shows that the torque imparted to the motor armature is higher than at the lower speed setting. As mentioned, this increased power input at higher speed is more or less compensated by windage and friction losses. Consequently, the tension in the material changes little so that a readjustment of rheostat 51 may be unnecessary, although the adjustment of this rheostat can be changed, if desired, in order to recalibrate the tension to any required value.

In order to wind up under zero tension, the operator has to place the tension adjusting rheostat 51 into the all-in position, at which point the regulating generator RG is set for maintaining a motor armature current approximately in accordance with the no-load current of the motor. In addition, the operator has to turn the selector switch 42 into the loop control position II so that the zero tension contactor ZC picks up and energizes the photoelectric control apparatus 66.

Assuming the rheostat 51 and switch 42 to be placed in the just mentioned loop control positions, the photoelectric control apparatus will operate in the following manner.

As stated previously, the winder motor 19 is now being regulated for no-load curent. If the motor runs at a slightly lower speed than it should, the slack loop 5 will gradually increase. When the length of the loop is such that the lower light beam is intercepted, the relay R1 closes. This upsets the balance of the bridge arrangement 57 so that a current is passed through the auxiliary pilot field 47 of the regulating generator RG in such a direction that the auxiliary pilot field winding 47 acts differentially with respect to the pattern field winding 46. As a result, the armature voltage of generator RG is decreased, and the motor field winding 21 receives less excitation, thereby increasing the motor speed and pulling the material 2 faster onto the reel 6. These conditions obtain only as long as the lower light beam is intercepted by the loop 5. As soon as the loop draws away from the light beam, relay R1 is deenergized and opens the contact 62 in order to return the regulating generator RG to its original calibration of regulating for no-load current.

A similar action occurs when the loop 5 is lifted out of the range of the upper light beam, thereby permitting the previously intercepted beam to impinge upon the photocell 70 and to cause relay R2 to close its contact 64. This closure unbalances the bridge 57 in the direction opposite to that previously mentioned and hence changes the calibration of the regulating generator RG so as to increase the regulator voltage. As a result, the excitation of motor field winding 21 is strengthened, and the motor is slowed down, thereby reducing the speed at which the material is wound onto the reel. The combined effect of the two photoelectric devices is to maintain the slack loop 5 between the upper and lower limits determined by the position of the two light beams.

The compensating voltage provided by the booster generator BG is mainly controlled by the series field winding 37 as far as the correction for the IR drop in the main armature circuit of the control system is concerned. The booster field winding 38 is added to this machine in order to provide for stalled tension on the strip material when the drive is stopped. Due to the field winding 38, a small current is circulated through the armature of the winder motor WM, thereby imposing a desired low tension on the material while the reel 6 remains stalled. The magnitude of tension under stall conditions can be adjusted by means of the rheostat 39.

The winder motor WM may be started while the calender 1 is operating at top speed. When under such conditions the start button 33 is actuated, thereby closing the main contactor MC, the relatively large time constant of the generator field 25 suffices to permit the winder motor WM a proper acceleration up to the speed proportional to that of the running calender. Such a starting operation of the winder motor requires, as a rule, that the speed of the calender drive is substantially not affected by the addition of load caused by the closing of the main generator circuit. For that reason, the application of a shunt motor for driving the calender, as represented by the illustrated motor CM, is preferable.

It will be understood by those skilled in the art that control systems according to the invention can be modified in various ways without departing from the principles and features of our invention. We, therefore, wish this specification to be considered as illustrative other than in a limiting sense, essential features and the scope of the invention being apparent from the claims attached hereto.

We claim as our invention:

1. A motor control system comprising a direct-current motor having an armature and field means, a generator having an armature and field means, means for driving said generator armature at variable speed, said generator armature being connected to said motor armature for imposing thereon a voltage dependent upon said speed, a booster generator disposed between said armatures of said main generator and said motors for IR drop compensation so as to maintain said voltage substantially straight proportional to said speed, and a regulating generator having an armature connected to said field means of both said main generator and said motor for providing variable field excitation therefor and having a regulator field winding connected with said motor armature for controlling said excitation in dependence upon the armature curent of said motor, booster generator and said regulating generator at substantially constant speed, whereby the speed of said motor is varied in dependence upon both the speed of said driving means of said main generator and the load of said motor.

2. A motor control system, comprising a direct-current motor having an armature, a separately excited field winding and a regulating field winding; a main generator having an armature connected to said motor armature to provide variable voltage therefor, a main field winding, and a regulating field winding acting differentially relative to said main field winding; means for driving said main generator armature at variable speed; circuit means for providing substantially constant excitation for said separately excited field winding and said main field winding; and a regulating generator having an armature connected with said two regulating field windings for supplying variable voltage therefor and having a pilot field winding for controlling said variable voltage in response to an operating condition of said motor, whereby the speed of said motor is controlled in dependence upon both the speed of said drive means and said operating condition.

3. A motor control system, comprising a direct-current motor having an armature, a separately excited field winding and a regulating field winding; a main generator having an armature connected to said motor armature to provide variable voltage therefor, a main field winding, and a regulating field winding acting differentially relative to said main field winding; means for driving said main generator armature at variable speed; circuit means for providing substantially constant excitation for said separately excited field winding and said main field winding; and a regulating generator having an armature connected with said two regulating field windings for supplying variable voltage therefor and being provided with a self-energizing field winding connected with said latter armature and a pilot field winding connected in series with said motor armature for controlling said variable voltage in accordance with the armature current of said motor, whereby the speed of said motor is controlled in dependence upon both the speed of said drive means and the load of said motor.

4. A system for controlling the speed of a winder drive in correlation to the speed of associated machinery, comprising a winder motor having an armature and two cumulative field windings, a main generator having an armature and two field windings for differential action relative to each other, said generator armature being electrically connected to said motor armature to provide variable voltage therefor, drive means for operating said generator armature at a speed proportional to the machinery speed in order to impose a corresponding control effect on said voltage, circuit means for providing normally constant excitation for one of said field windings of said motor and said main generator respectively, and a regulating generator having an armature electrically connected to said other field windings of said motor and said main generator to supply variable excitation therefor and having a pilot field winding connected with said motor armature to control said variable excitation in dependence upon the armature current of said motor, whereby the motor speed is regulated for substantially constant winding tension.

5. A system for controlling the speed of a winder drive in correlation to the speed of associated machinery, comprising a winder motor having an armature and two cumulative field windings, a main generator having an armature and two field windings for differential action relative to each other, said generator armature being electrically connected to said motor armature to provide variable voltage therefor, drive means for operating said generator armature at a speed proportional to the machinery speed in order to impose a corresponding control effect on said voltage, circuit means for providing normally constant excitation for one of said field windings of said motor and said main generator respectively, and a regulating generator having an armature electrically connected to said other field windings of said motor and said main generator to supply variable excitation therefor and being provided with a pilot field winding and a pattern field winding acting differentially relative to each other, said pilot field winding being connected with said motor armature to be excited in proportion to the armature current of said motor, and circuit means connected to said pattern field winding and having an adjusting member for providing adjustable excitation for said pattern field winding, whereby the motor speed is regulated for maintaining the winding tension substantially at a value determined by the setting of said adjusting member.

6. A system for controlling the speed of a winder drive in correlation to the speed of associated machinery, comprising a winder motor having an armature and two cumulative field windings, a main generator having an armature and two field windings for differential action relative to each other, said generator armature being electrically connected to said motor armature to provide variable voltage therefor, drive means for operating said generator armature at a speed proportional to the machinery speed in order to impose a corresponding control effect on said voltage, circuit means for providing normally constant excitation for one of said field windings of said motor and said main generator respectively, and a regulating generator having an armature electrically connected to said other field windings of said motor and said main generator to supply variable excitation therefor and being provided with a pilot field winding and a pattern field winding acting differentially relative to each other, said pilot field winding being connected in series with said motor armature and main generator armature to be excited by the armature current of said motor, circuit means connected to said pattern field winding and having an adjusting member for providing adjustable excitation for said pattern field winding, and a booster generator connected in series with said motor armature for IR drop compensation so that the armature voltage of said motor varies in substantially straight proportion to said machinery speed.

7. A system for controlling the speed of a winder drive in correlation to the speed of associated machinery, comprising a winder motor having an armature and two cumulative field windings, a main generator having an armature and two field windings for differential action relative to each other, said generator armature being electrically connected to said motor armature to provide variable voltage therefor, drive means for operating said generator armature at a speed proportional to the machinery speed in order to impose a corresponding control effect on said voltage, circuit means for providing normally constant excitation for one of said field windings of said motor and said main generator respectively, and a regulating generator having an armature electrically connected to said other field windings of said motor and said main generator to supply variable excitation therefor and having a field winding for controlling said variable excitation, and loop-controlled apparatus connected to said field winding for providing it with variable excitation in dependence upon the position of a slack loop formed by the winding material, whereby the speed of said motor is regulated so as to maintain said position between given limits.

8. A system for controlling the speed of a winder for slack material in correlation to the speed of associated machinery, comprising a winder motor, electric means for energizing said motor in dependence upon the machinery speed so that the motor speed is approximately adjusted to the machinery speed, regulating means associated with said energizing means and having a control member connected with said motor for varying said motor speed in dependence upon the motor load so as to maintain said load substantially at a constant value in accordance with a desired winding tension, adjusting means forming part of said regulating means for setting said load value between maximum and substantially zero limits, control apparatus having means responsive to positional changes of a slack loop formed by the material to be wound and disposed for causing said regulating means to vary said motor speed so as to wind the material under maintenance of the slack loop, and switch means interlocked with said adjusting means for rendering said apparatus operative only when said adjusting means is set for substantially zero tension.

9. A system for driving a winder at a speed correlated to that of associated machinery, comprising a direct-current winder motor having an armature, a main generator having an armature electrically connected to said motor armature to provide variable voltage therefor and having field winding means and means for driving said generator armature at a speed proportional to that of the machinery, a regulating generator having a regulator armature connected to said field winding means for controlling the field excitation of said main generator and having a voltage-sustaining self-energizing field winding, a pilot field winding and a pattern field winding, said pilot field winding and said pattern field winding being differential and balanceable relative to each other, said pilot field winding being connected with said motor armature to be excited in dependence upon the armature current of said motor, circuit means connected to said pattern field winding to provide constant excitation therefor and having adjusting means for selecting the value of said constant excitation in accordance with a desired winding tension, a booster generator for IR drop compensation electrically connected with said motor armature and having a separately excited field winding, and circuit means for exciting said latter field winding so as to maintain a current through said motor armature in accordance with a stalled tension desired under stalled condition of the winder.

10. A system for driving a winder at a speed correlated to that of associated machinery, comprising a direct-current winder motor for driving the winder, a main generator operative at a speed proportional to that of the machinery and having an armature circuit in common with said motor for providing load current for said motor, field winding means disposed on said main generator and on said motor and comprising a regulating field winding on at least one of them, a regulating generator having an armature connected to said regulating field winding and having a self-energizing voltage-sustaining field winding, two pilot field windings and a pattern field winding, one of said pilot field windings being differential relative to said patern field winding and being connected with said motor to be excited in accordance with the motor current supplied by said main generator, circuit means connected to said pattern field winding to provide constant excitation therefor and having adjusting means for selecting the value of said constant excitation in accordance with a desired winding tension, loop-controlled apparatus connected to said other pilot field winding for providing it with reversible excitation in dependence upon the position of a slack loop formed by the material to be wound, and control means interlocked with said adjusting means for permitting said control apparatus to become operative only when said adjusting means is set for substantially zero winding tension.

11. A system for driving a winder at a speed correlated to that of associated machinery, comprising a direct-current winder motor having an armature and two cumulative field windings, a main generator having an armature and two field windings for differential action relative to each other, said generator armature being electrically connected to said motor armature to provide variable voltage therefor, drive means for operating said generator armature at a speed proportional to the machinery speed in order to impose a corresponding control effect on said voltage, circuit means for providing normally constant excitation for one of said field windings of said motor and said main generator respectively, a regulating generator having an armature connected to said other field windings and having a self-energizing voltage-sustaining field winding, two pilot field windings and a pattern field winding, one of said pilot field windings being differential relative to said pattern field winding and being connected with said motor armature to be excited in accordance with the armature of said motor, circuit means connected to said pattern field winding to provide constant excitation therefor and having adjusting means for selecting the value of said constant excitation in accordance with a desired winding tension between substantially zero and maximum tension, loop-controlled apparatus connected to said other pilot field winding for providing it with reversible excitation in dependence upon the position of a slack loop formed by the material to be wound, and control means interlocked with said adjusting means for permitting said control apparatus to become operative only when said adjusting means is set for substantially zero winding tension.

WILLIAM H. FORMHALS.
FRANK C. FENNELL.

REFERENCES CITED

The following references are of record in the file of this patent:

UNITED STATES PATENTS

| Number | Name | Date |
|---|---|---|
| 865,819 | Powell | Sept. 10, 1907 |
| 865,821 | Richards | Sept. 10, 1907 |
| 2,246,294 | Cook | June 17, 1941 |
| 2,379,132 | Cook | June 26, 1945 |
| 1,977,197 | Neus | Oct. 16, 1934 |
| 2,165,127 | Carnegie | July 4, 1939 |
| 2,305,937 | Montgomery et al. | Dec. 22, 1942 |
| 2,323,741 | Watson | July 6, 1943 |
| 2,147,421 | Bendz | Feb. 14, 1939 |
| 2,283,121 | Michel | May 12, 1942 |

FOREIGN PATENTS

| Number | Country | Date |
|---|---|---|
| 443,744 | France | July 22, 1912 |